United States Patent

Baba et al.

[15] 3,647,249
[45] Mar. 7, 1972

[54] BALL JOINT
[72] Inventors: Takashi Baba; Chikara Matsuoka, both of Aichi-ken, Japan
[73] Assignee: Toyota Jidosha Kogyo Kabushiki Kaisha, Toyota-shi, Aichi-ken, Japan
[22] Filed: Sept. 14, 1970
[21] Appl. No.: 71,683

Related U.S. Application Data

[63] Continuation-in-part of Ser. No. 760,849, Sept. 19, 1968, abandoned.

[52] U.S. Cl. .......................................287/90 R, 308/238
[51] Int. Cl. ..................................................F16c 11/06
[58] Field of Search............287/90 R, 87, 85 A, 90 C; 308/238

[56] References Cited

UNITED STATES PATENTS 3,236,573  2/1966  Donnellan ............................308/238
3,250,554  5/1966  Roode ....................................287/87
2,459,598  1/1949  Stott ......................................308/238
2,880,025  3/1959  Herbenar et al. ....................287/85 A Primary Examiner—Andrew V. Kundrat
Attorney—Harry G. Shapiro

[57] ABSTRACT

In a ball joint, the bearing for the ball or ball-like element comprises a support portion of a lubricant-resistant, elastically deformable rubberlike material having a surface layer formed to complement the ball-like member. The surface layer is of a wear- and lubricant-resistant synthetic resin having a low coefficient of friction, and is deformable in conformity with the underlying elastically deformable support portion. The surface layer has an opening or openings extending therethrough which serve as a reservoir for a lubricating oil and to moderate or impart flexibility to the surface layer.

3 Claims, 8 Drawing Figures

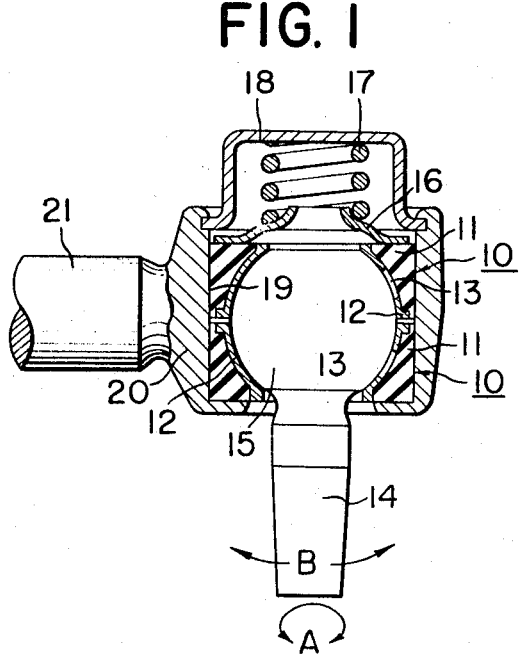
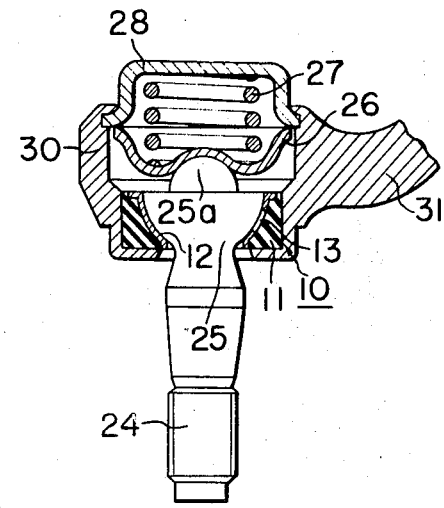
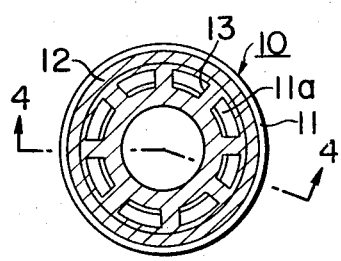
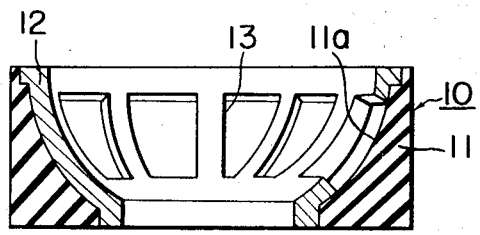

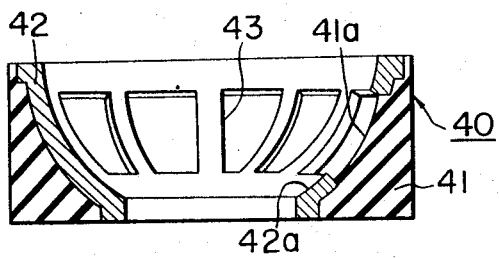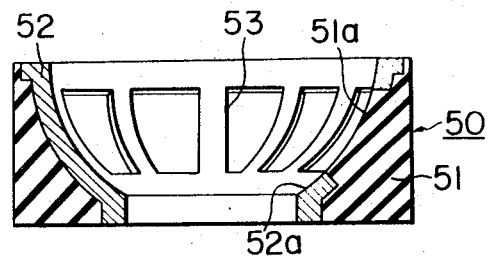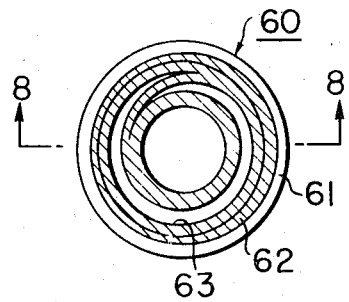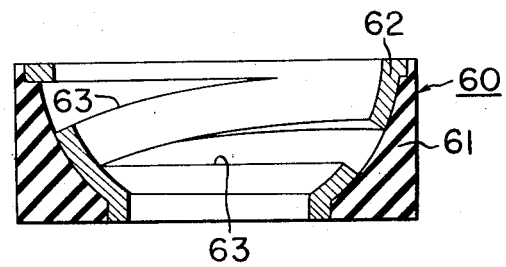

BALL JOINT

This application is a continuation-in-part of our pending application Ser. No. 760,849; filed Sept. 19, 1968 and now abandoned.

The invention relates to ball joints and is more particularly directed to improvements in bearings for a ball or ball-like member primarily for use in the steering linkage and the suspension system of an automobile.

In ball joints, it is desired that there be afforded a predetermined constant frictional torque when there is relative motion between the bearing and the ball or ball-like member seated in the bearing. When the surface portion of a bearing which contacts the ball or ball-like member is made of metal, it is difficult to maintain uniform or constant dynamic frictional forces with the change of lubricating conditions. Although the contact surfaces of the bearing and the ball are well finished, it is practically impossible to obtain uniform contact pressure, particularly where there is sliding friction resulting from the relative movement between the ball and the bearing. As a result, it is difficult to obtain constant frictional torque of predetermined value when there is relative motion in rotation or sliding of the parts.

Suitable synthetic resins have been developed for use in bearings. However, synthetic resins are subject to plastic deformation, and it has been difficult to retain the desired or predetermined pressure between the bearing and the adjoining ball, and as a result, it has been difficult to stabilize or obtain a predetermined constant frictional torque. When the bearing is made of rubber, including the surface which engages or contacts the ball, suitable contact pressure is obtained by virtue of the elasticity of the rubber. However, a bearing having a surface layer of rubber has its limitations because the frictional torque may readily change depending upon lubricating conditions and the possibilities of abrasion.

An object of this invention is to provide a ball joint frictional torque of which is constant upon rotation and swing movement.

In accordance with the invention, a ball joint is provided wherein the ball or ball-like member is surrounded by a bearing characterized in that the bearing is mainly composed of a rubberlike or elastomeric material, and a wear-resistant synthetic resin having a low coefficient of friction is applied to or embedded therein as a surface layer for contact with the ball or ball-like member. The surface layer is shaped into an appropriate form, and preferably has an opening or openings extended therethrough, so that it may be deformed along with the rubberlike material. As a result, the contact pressure between the ball and the bearing is stabilized by the elasticity of the rubberlike material and the conformity therewith of the overlying wear-resistant surface layer having a low coefficient of friction. In operation, the sliding movement is between the wear-resistant synthetic resin and the ball, and therefore the stability of lubrication and abrasion is excellent, and a predetermined and in swing movement.

This invention will be described more clearly referring to the illustrative embodiments shown in the attached drawing, in which:

FIG. 1 is a cross-sectional front view of an embodiment of the steering ball joint of this invention;

FIG. 2 is a cross-sectional front view of an embodiment of a suspension ball joint of the invention;

FIG. 3 is a cross section view of a bearing member made in accordance with the invention;

FIG. 4 is en enlarged cross-sectional view in the planes of line 4–4 of FIG. 3;

FIG. 5 and FIG. 6 are views similar to FIG. 4, these views illustrating modifications of the invention;

FIG. 7 is a view similar to FIG. 3, this view showing an embodiment of the invention wherein the opening in the surface layer of the bearing member is in the form of a spiral; and FIG. 8 is an enlarged cross-sectional view taken in the plane of line 8–8 of FIG. 7.

Referring to FIG. 1; 15 is ball or ball-like member; 20 is a socket; 10 is a bearing member; 17 is a coil spring. The structure of the assemblage is as follows, i.e., a cylindrical insertion bore 19 is provided in the socket 20, and the bearing members 10 surrounding the ball 15 are inserted into said insertion bore 19, and the stud 14 of the ball 15 and the tie rod 21 of the socket 20 are rotatably and tiltably connected. The bearing member 10 is formed in such a manner as to support a semispherical portion of the ball 15 as is shown in FIG. 4 to FIG. 6 and FIG. 8, and therefore when the ball 15 is provided within the socket 20, two bearing members, i.e., the upper and lower bearing members are provided to surround the ball 15 as a whole. A closure cap 18 for sealing the insertion bore 19 is provided on the upper portion of the socket 20, a spring seat plate 16 is provided on the upper portion of the upper bearing member 10, and a coil spring 17 is provided between the spring seat plate 16 and the closure cap 18. Resilient pressure is imparted to the contact surfaces of the ball 15 and the bearing members 10 by the coil spring 17. Lubricant is placed in the closure cap 18.

Referring to FIG. 2 shows another embodiment of a ball joint for a suspension system, a ball-like member 25 is formed in a semispherical form, and the semispherical portion is supported by a bearing member 10 similar to a bearing member for a ball joint as shown in FIG. 1. A spring seat plate 26 is provided on the small spherical portion 25a formed on the upper portion of the semispherical portion 25, and the semispherical portion 25 is pushed down by a coil spring 27 provided between the spring seat plate 26 and a closure cap 28. As a result, resilient pressure is imparted to the contact surfaces of the semispherical portion 25 and the bearing member 10.

Referring to FIGS. 3 and 4, the bearing member 10 comprises a support portion 11 and surface layer 12 attached or adhered thereto. The support portion is made or molded of a lubricant-resistant, elastically deformable rubberlike or elastomeric material such as an acrylonitrile polymer or an acrylonitrile-butadiene copolymer. The surface layer is formed to complement the ball or ball-like member, and is made of wear- and lubricant-resistant synthetic resin having a low coefficient of friction. Examples of suitable materials are nylon or a polyamide, teflon or a polytetrafluro-ethylene, and a phenolic resin. The surface layer 12 is deformable in conformity with the underlying elastically deformable support portion 11.

The surface layer 12, which contacts the ball 15 or the ball-like member 25, lies upon and is adhered to the outer surface 11a of the support portion 11. The surface layer is provided with an opening which serves to impart flexibility to the surface layer so that it may more readily deform in conformity with the underlying elastically deformable support portion. Also, since the outer surface of the surface layer is spaced from the outer surface 11a of the support portion, the opening provides a recess adapted to provide a reservoir for a lubricant. In the embodiment of the invention shown in FIGS. 3 and 4, a plurality of openings 13 of generally or substantially trapezoidal configuration extend through the surface layer.

In the embodiments of the invention shown in FIGS. 5 and 6, the bearing members are designated 40 and 50, respectively. Also, as in the form of the invention shown in FIGS. 3 and 4, the surface layers 42 and 52 are provided with openings 43 and 53 respectively. In the showing of FIG. 5, the surface layer 42 has a portion of its thickness embedded in the outer surface 41a of the support portion 41. With such form of bearing member a ball or ball-like member will engage the outer surface 42a of the surface layer, and will not contact the surface 41a of the support portion 41. The openings 43 furnish the dual function of imparting flexibility to the surface layer 42 so that the layer is more readily deformable with the elastically deformable support portion 41 and the recesses at the openings act to retain a lubricating oil.

In the embodiment of the invention illustrated in FIG. 6, the surface layer 52 is embedded in the support portion 51 so that the outer surface 51a of the support portion 51 in the areas of openings 53 is substantially flush or only slightly below the outer surface 52a of the surface layer 52. The surface 51a does not project above the surface 52a so that the wear is absorbed by the surface layer. Although this embodiment of the invention furnishes little of the lubricant reservoir function, the openings 53 in the surface layer impart flexibility to the layer for better conformity to the underlying elastically deformable support portion.

In the form of the invention illustrated in FIG. 7 and 8, the bearing member is designated 60, with the support portion and the surface layer having the designations 61 and 62, respectively. The surface layer is provided with an opening in the form of a spiral 63 which extends through the surface layer.

In each of the described embodiments of the invention, the surface layer is molded to the desired semispherical contour and thickness, and with the described opening or openings extended therethrough. The support portion is then molded to the preformed surface layer. The mold may be provided with projections at selected areas to extend into the openings of the surface layer to limit flow through the openings of the material which will constitute the support portion. Also, the molded surface layer may be adhered to a molded support portion by a suitable adhesive or only set thereon.

In operation, the sliding movement which occurs when there is relative movement between the bearing and the ball in rotation or in swinging movement, as indicated by the arrows A and B as shown in FIG. 1, is between the surface layer 12 and the ball 15. Due to the construction of the bearing member or members as hereinbefore described, the ball joint operates at a predetermined constant frictional torque in rotation, or in swing movement, or in a combination of such movements. Also, the opening or openings in the surface layer of the bearing member or members furnishes a reservoir for a lubricant.

It will be apparent that the surface layer may be provided with an opening or openings having configurations other than as illustrated and hereinbefore described.

The particular configuration of the opening or openings in the surface layer selected is determined by the elastic deformation or the stress-reducing property of the materials used for the support portion and the surface layer. When a relatively soft synthetic resin is used for the surface layer it is preferred that the openings have the form as illustrated in FIGS. 3, 4, 5 and 6. When a relatively hard synthetic resin composition is used for the surface layer, it is preferred that the opening have the shape or configuration as shown in FIGS. 7 and 8.

The advantages and improved results of the invention will be apparent from the foregoing description of several preferred embodiments of the invention. Various changes and modifications may be made without departing from the spirit and scope of this invention as sought to be defined in the claims.

We claim:

1. In a ball joint comprising a ball-like member and a bearing member therefore, the bearing member comprising a support portion of a lubricant-resistant, elastically deformable rubberlike material having a surface layer attached thereto, the surface layer being formed to complement the ball-like member, said surface layer being of a wear- and lubricant-resistant synthetic resin having a low coefficient of friction, the surface layer having at least one opening extending therethrough, the surface layer being deformable in conformity with the underlying support portion.

2. In a ball joint as set forth in claim 1, wherein the opening in the surface layer is spirally formed.

3. In a ball joint as set forth in claim 1, wherein the opening comprises a plurality of openings each having a substantially trapezoidal configuration.

* * * * *

UNITED STATES PATENT OFFICE
CERTIFICATE OF CORRECTION

Patent No. 3,647,249　　　　　　　　　Dated March 7, 1972

Inventor(s) Takashi Baba; Chikara Matsuoka

It is certified that error appears in the above-identified patent and that said Letters Patent are hereby corrected as shown below:

Column 1, line 37, after "joint" insert -- the --;

line 57, after "predetermined" insert -- constant frictional torque is furnished in relative rotation --;

line 65, change "cross section" to -- cross-sectional --;

line 67, change "en" to -- an --; and

Column 4, line 29, after "therethrough," insert -- the outer surface of the surface layer being spaced from the support portion to provide a recess at the opening adapted to provide a reservoir for a lubricant, --.

Signed and sealed this 6th day of March 1973.

(SEAL)
Attest:

EDWARD M. FLETCHER, JR.　　　　ROBERT GOTTSCHALK
Attesting Officer　　　　　　　　Commissioner of Patents